United States Patent
Sabbavarpu

(10) Patent No.: US 10,706,122 B2
(45) Date of Patent: Jul. 7, 2020

(54) AUTOMATED ACCESSIBILITY TESTING

(71) Applicant: Thub Inc., Ellicott City, MD (US)

(72) Inventor: Chandra Sekhar Sabbavarpu, Ellicott City, MD (US)

(73) Assignee: CHANDRA SEKHAR SABBAVARPU, Ellicott City, MD (US)

( * ) Notice: Subject to any disclaimer, the term of this patent is extended or adjusted under 35 U.S.C. 154(b) by 0 days.

(21) Appl. No.: 16/480,499

(22) PCT Filed: Feb. 12, 2018

(86) PCT No.: PCT/US2018/017736
§ 371 (c)(1),
(2) Date: Jul. 24, 2019

(87) PCT Pub. No.: WO2018/148619
PCT Pub. Date: Aug. 16, 2018

(65) Prior Publication Data
US 2020/0081927 A1    Mar. 12, 2020

Related U.S. Application Data

(60) Provisional application No. 62/458,297, filed on Feb. 13, 2017.

(51) Int. Cl.
*G06F 16/958* (2019.01)
*G06F 16/957* (2019.01)
(Continued)

(52) U.S. Cl.
CPC ........ *G06F 16/958* (2019.01); *G06F 11/3086* (2013.01); *G06F 16/9577* (2019.01); *G06F 40/14* (2020.01); *G06F 40/221* (2020.01)

(58) Field of Classification Search
CPC ............................. G06F 11/3086; G06F 40/14
See application file for complete search history.

(56) References Cited

U.S. PATENT DOCUMENTS

| | | |
|---|---|---|
| 8,196,104 B2 | 6/2012 | Cohrs et al. |
| 8,239,820 B1 * | 8/2012 | White ................ G06F 11/3688 717/100 |

(Continued)

FOREIGN PATENT DOCUMENTS

WO     2014190219 A1    11/2014

OTHER PUBLICATIONS

International Search Report; PCT/US2018/017736; dated Sep. 13, 2018; 8 pages.

(Continued)

*Primary Examiner* — Asher D Kells
(74) *Attorney, Agent, or Firm* — Dickinson Wright PLLC

(57) ABSTRACT

Apparatuses, methods, and non-transitory computer readable medium for accessibility testing are disclosed. Accessibility testing can include receiving input source data from one or more input sources which can include HTML files. The input source data is parsed, which includes determining a document object model for each of the one or more input sources. The one or more input sources that satisfy a violation criterion are determined, based on the parsing of the document object model for each of the one or more input sources. An accessibility report is generated and includes the one or more input sources that are determined to satisfy the violation criterion.

20 Claims, 4 Drawing Sheets

(51) Int. Cl.
*G06F 40/221* (2020.01)
*G06F 40/14* (2020.01)
*G06F 11/30* (2006.01)

(56) References Cited

U.S. PATENT DOCUMENTS

| | | |
|---|---|---|
| 8,533,684 B2 | 9/2013 | Brunet et al. |
| 8,572,549 B2 | 10/2013 | Ganesh et al. |
| 2002/0152283 A1 | 10/2002 | Dutta et al. |
| 2005/0160065 A1* | 7/2005 | Seeman .............. G06F 16/9535 |
| 2006/0277250 A1 | 12/2006 | Cherry et al. |
| 2008/0155411 A1 | 6/2008 | Christensen |
| 2009/0228573 A1* | 9/2009 | Asakawa .................. G09B 5/04 |
| | | 709/218 |
| 2012/0136974 A1* | 5/2012 | Hu ........................ G06F 16/957 |
| | | 709/220 |
| 2012/0324424 A1* | 12/2012 | Breeds ................ G06F 11/3684 |
| | | 717/110 |
| 2014/0164442 A1 | 6/2014 | de la Iglesia et al. |
| 2014/0351796 A1* | 11/2014 | Gur-esh .............. G06F 11/3604 |
| | | 717/126 |
| 2016/0261475 A1* | 9/2016 | Jadhav .................... G06F 16/95 |
| 2017/0269816 A1* | 9/2017 | Bradley .................. G10L 15/22 |
| 2019/0042397 A1* | 2/2019 | Vignesh .............. G06F 11/3688 |

OTHER PUBLICATIONS

Written Opinion; PCT/US2018/017736; dated Aug. 16, 2018; 5 pages.

\* cited by examiner

AUTOMATED ACCESSIBILITY TESTING

CROSS-REFERENCE TO RELATED APPLICATION(S)

This application claims priority to and the benefit of U.S. Provisional Patent Application Ser. No. 62/458,297, filed Feb. 13, 2017, the entire disclosure of which is hereby incorporated by reference.

TECHNICAL FIELD

This disclosure relates in general to methods, apparatuses, and non-transitory computer-readable medium for accessing, testing, and validating data including document object models for input sources including hypertext markup language (HTML) documents.

BACKGROUND

Documents such as web pages can include various elements that modify the way in which the web pages are presented to a user. Further, the web pages can include both static and dynamic elements that influence the way in which a user interacts with the web page. Due to the differing needs of different users and different ways of rendering or implementing the web pages, the output of the web pages may be less than optimal.

SUMMARY

Disclosed herein are aspects of implementations of methods, apparatuses, and non-transitory computer readable medium for accessibility testing.

Disclosed herein is a method for accessibility testing. The method for accessibility testing includes receiving, by a computing device, input source data from one or more input sources. The method includes parsing, by the computing device, the input source data, wherein the parsing includes determining a document object model for each of the one or more input sources. The method includes determining, by the computing device, the one or more input sources that satisfy a violation criterion based on the parsing of the document object model for each of the one or more input sources. The method includes generating, by the computing device, an accessibility report including the one or more input sources that are determined to satisfy the violation criterion.

Also disclosed herein is an apparatus for accessibility testing. The apparatus for accessibility testing includes a memory and a processor configured to execute instructions stored in the memory. The apparatus receives input source data from one or more input sources. The apparatus parses the input source data, wherein the parsing includes determining a document object model for each of the one or more input sources. The apparatus determines the one or more input sources that satisfy a violation criterion based on the parsing of the document object model for each of the one or more input sources. The apparatus generates an accessibility report including the one or more input sources that are determined to satisfy the violation criterion.

Also disclosed herein is a non-transitory computer-readable storage medium. The non-transitory computer-readable storage medium can comprise executable instructions that, when executed by a processor, perform operations. The operations include receiving input source data from one or more input sources. The operations also include parsing the input source data, wherein the parsing includes determining a document object model for each of the one or more input sources. The operations further include determining the one or more input sources that satisfy a violation criterion based on the parsing of the document object model for each of the one or more input sources. The operations include generating an accessibility report including the one or more input sources that are determined to satisfy the violation criterion.

Details, modifications, and implementations of the methods, apparatuses, and non-transitory computer readable medium for accessibility testing are further disclosed below and in the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
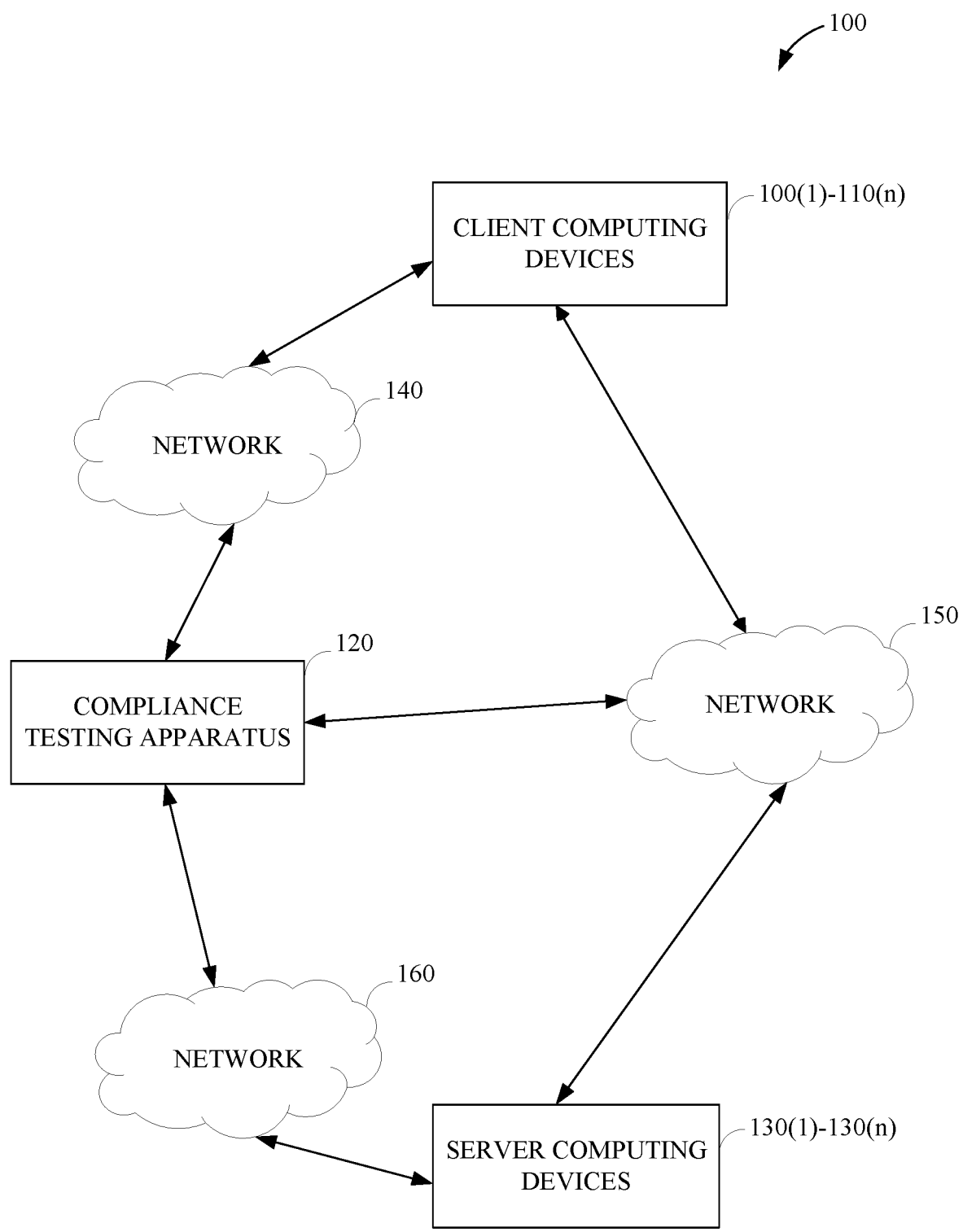
FIG. 1 is a block diagram illustrating an electronic computing and communication system for use in accordance with the present disclosure.

Input sources, including documents such as HTML files and extensible markup language (XML) documents, can be used to generate content that includes static elements (e.g., non-interactive text or images) and interactive elements (e.g., dynamic control elements in a document that can be modified or manipulated by a user). Further, the input sources can be parsed to further expose the structure of the input source. One way of exposing the structure of the input source is through creation or extraction of an object model, such as a document object model (DOM). By analyzing the document object model associated with the input sources, the disclosed technology can determine whether the input sources are valid or in compliance with one or more predetermined standards including Access Board Section 508 standards and W3C's Web Content Accessibility Guidelines (WCAG 2.0).

Further, the disclosed technology can test compliance by using rules including default rules for testing compliance with the predetermined standards. The default rules can include a default set of violation rules, which can be bolstered by custom violation rules that users can add, modify, or remove from a violation rules dataset that includes a combination of the predetermined standards, as well as the customized set of violation rules that a user can add to further enhance accessibility compliance testing. The customized set of rules can be adapted to different contexts, thereby enabling a greater level of conformity to particular standards or rules for different sets of input sources.

The disclosed technology can be configured so that it can be integrated into existing frameworks and tools, thereby leveraging the benefits of other toolsets that lack the novel features of the disclosed technology. Furthermore, a unique application programming interface (API), which can include features of a representational state transfer API (REST API), can be used to execute and operate compliance testing from unit tests, API tests, integration tests, functional automated tests, or other REST API clients.

The disclosed technology provides more effective compliance testing by providing a configurable depth parameter that can be left at a default value or configured by a user to determine the extent to which input sources, such a web pages, are traversed (e.g., the extent to which web pages are crawled). Also, the user experience can be enhanced through the use of an intuitive interface that can be accessed through the internet (e.g., a web interface), thereby allowing a user to perform compliance testing from various locations. Further, with respect to deployment, the disclosed technology can be deployed in a variety of computing environments including local computing devices, private clouds, and public clouds.

By determining compliance with the predetermined accessibility or compliance standards, input sources can be in compliance with recommended or mandated accessibility requirements (e.g., government compliance standards including accessibility for physically challenged users). Accordingly, the disclosed technology is able to provide more efficient use of computing resources through more compliant input sources, as well as an improved user experience for users that view and interact with the output generated by the input sources.

FIG. 1 is a block diagram illustrating an electronic computing and communication system 100 for use in accordance with the present disclosure. The electronic computing and communication system 100 includes a plurality of client computing devices 110(1)-110(n), an accessibility testing apparatus 120, a plurality of server computing devices 130(1)-130(n), and a network 140/150/160. The electronic computing and communication system 100 can be configured in a variety of configurations including the network 140/150/160, a client-server system, a peer-to-peer system, a distributed computing system, a clustered computing system, a cloud computing system, and a clustered computing system.

Each of the plurality of client computing devices 110(1)-110(n) can include any of one or more processors, a memory, a network interface controller (NIC), one or more input/output devices, and a bus. The plurality of client computing devices 110(1)-110(n) can operate or execute applications (e.g., software applications) some or all of which can be operated or executed on the plurality of client computing devices 110(1)-110(n).

Applications that can be operated or executed on the plurality of client computing devices 110(1)-110(n) include web applications, database applications, and applications related to the validation and testing of web pages. The plurality of client computing devices 110(1)-110(n) can be configured to exchange (send or receive) signals (e.g., electronic signals) including data with other computing devices including the plurality of server computing devices 130(1)-130(n). The exchange or communication of data by the plurality of client computing devices 110(1)-110(n) can be performed via communication networks (e.g., wired or wireless communication networks) including the network 140/150/160. The data that is exchanged by the plurality of client computing devices 110(1)-110(n) can be in an encrypted or an unencrypted form (e.g., plain text).

The accessibility testing apparatus 120 can include any of one or more processors, a memory, a network component (e.g., network interface controller), one or more input/output devices, and a bus. Applications that can be operated or executed on the accessibility testing apparatus 120 include web applications (e.g., applications accessed through a web interface), database applications, and applications related to the testing of input sources including HTML documents and XML documents.

The accessibility testing apparatus 120 can be configured to exchange (send or receive) signals (e.g., electronic signals) including data with other computing devices including the plurality of client computing devices 110(1)-110(n) and the plurality of server computing devices 130(1)-130(n). Further, the accessibility testing apparatus 120 can perform some or all portions of the operations in the disclosed technology locally or with another computing device (e.g., some portions of the operations or instructions for the disclosed technology may be stored or performed on external devices including cloud based computing devices).

Each of the plurality of server computing devices 130(1)-130(n) can include any of one or more processors, a memory, a network interface controller (NIC), one or more input/output devices, and a bus. The plurality of server computing devices 130(1)-130(n) can operate or execute applications (e.g., software applications) some or all of which can be operated or executed on the plurality of server computing devices 130(1)-130(n).

Applications that can be operated or executed on the plurality of server computing devices 130(1)-130(n) include web applications, database applications, and applications related to the validation and testing of web pages. The plurality of server computing devices 130(1)-130(n) can be configured to exchange (send or receive) signals (e.g., electronic signals) including data with other computing devices including the plurality of client computing devices 110(1)-110(n). The exchange or communication of data by the plurality of server computing devices 130(1)-130(n) can be performed via communication networks (e.g., wired or wireless communication networks) including the network 140/150/160. The data that is exchanged by the plurality of server computing devices 130(1)-130(n) can be encrypted or unencrypted.

The network 140/150/160 can include any type of network that can be used to exchange (send or receive) signals (e.g., data) or communicate information, including a local area network (LAN), a wide area network (WAN), a storage area network (SAN), a virtual private network (VPN), a mesh network, and the Internet. The network 140 and the network 150 can be used to exchange data between computing devices including the plurality of client computing devices 110(1)-110(n), the accessibility testing apparatus 120, the plurality of server computing devices 130(1)-130(n), gateways, hubs, routers, switches, bridges, and any other types of devices that can exchange or be used to transmit signals including data. Further, the configuration or topology of the network 140/150/160 can be different from the configuration or topology illustrated in FIG. 1.

Figure 2:
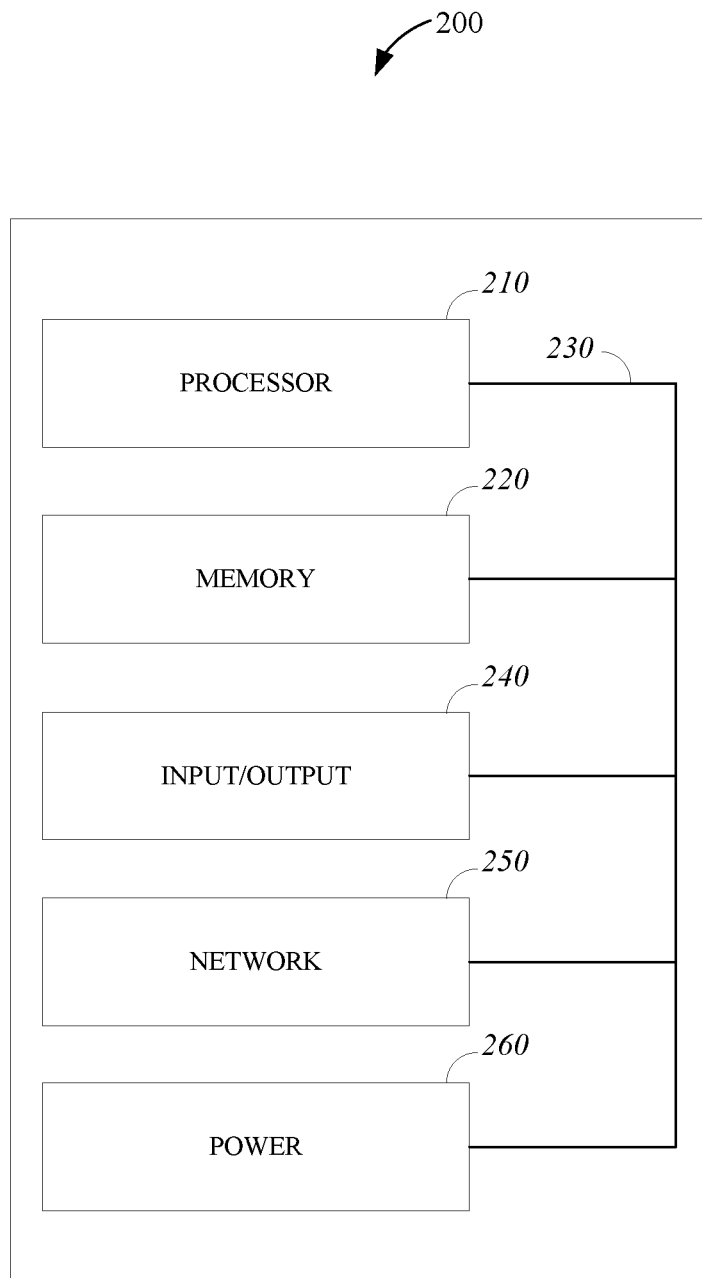
FIG. 2 is a block diagram illustrating an example of an accessibility testing apparatus for use in accordance with the present disclosure.

FIG. 2 is a block diagram illustrating an example of an accessibility testing apparatus 200 in which the features and elements of the disclosed technology may be implemented. The accessibility testing apparatus 200 can include a processor 210, a memory 220, a bus 230, an input/output component 240, a network component 250, and a power supply 260.

The processor 210 can execute one or more instructions including program instructions, which can be stored in a memory (e.g., the memory 220). The processor 210 can include one or more: central processing units (CPUs) with one or more cores; special purpose processors with one or more cores; digital signal processors (DSPs); microprocessors; controllers; microcontrollers; integrated circuits; Application Specific Integrated Circuits (ASIC); Field Programmable Gate Arrays (FPGA); or programmable logic controllers.

The memory 220 can include a tangible non-transitory computer-readable medium for storing program instructions including machine-readable instructions, computer-readable instructions, or any type of instructions which may be encoded as data and used by a processor (e.g., the processor 210). For example, the memory 220 can include any computer readable medium that may be accessed by the processor 210, including read only memory (ROM) or random access memory (RAM). Further, the memory 220 can include volatile memory (e.g., DRAM, SRAM) or non-volatile memory including: solid state drives (SSDs); hard disk drives (HDDs); non-volatile random access memory; or erasable programmable read-only memory (EPROM).

The bus 230 can include an internal bus or an external bus and may be used to couple components including the processor 210, the memory 220, the input/output component 240, and the network component 250. The bus 230 can be used to transfer signals, including data, between the different components. For example, the bus 230 can include one or more buses including: a universal serial bus (USB); a peripheral component interconnect (PCI); PCI Express; a Serial AT attachment (SATA); or a HyperTransport (HT) bus.

The input/output component 240 can be used to receive input (e.g., from an input device) or generate output (e.g., to an output device). Signals, including data relating to the inputs and outputs associated with the input/output component can be transmitted via the bus 230. The input/output component 240 can receive input from input devices including touchscreens, keyboards, computer mice, and microphones. The input/output component 240 can generate output in output devices including computer displays (e.g., LCD monitors) and loudspeakers.

The network component 250 can include any combination of hardware, software, or firmware, that is used to exchange (send or receive) signals (e.g., electronic signals) including communicate data (e.g., file data) either locally within the accessibility testing apparatus 200 or to other devices. In an implementation, the network component 250 includes a communication interface (e.g., a network interface card) that can be configured to transmit or receive data from other devices.

The power supply 260 can include a device that supplies energy (e.g., electrical energy) to a component that consumes energy (e.g., the processor 210, the memory 220). The power source can include an energy source component including a battery, fuel cell, generator, or other source of energy.

Figure 3:
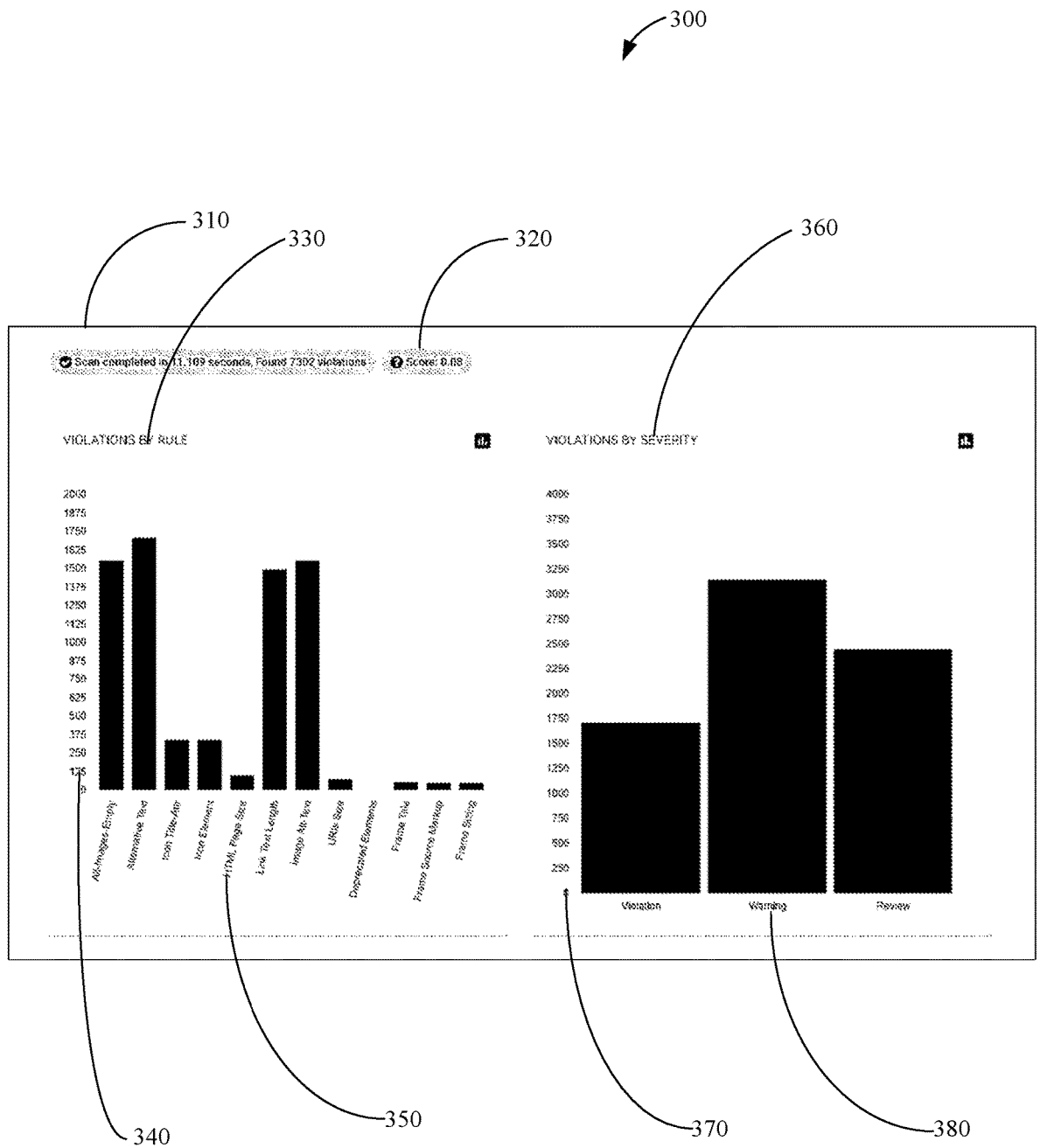
FIG. 3 is a block diagram illustrating an example of an interface for use in accordance with the present disclosure.

FIG. 3 illustrates a diagram of an accessibility report interface 300 generated by a computing device such as an accessibility testing apparatus 120, illustrated in FIG. 1, or an accessibility testing apparatus 200, illustrated in FIG. 2.

The accessibility report interface 300 for automated accessibility testing, can include at least one of: a violation time stamp indicator 310; a violation score indicator 320; a violation by rule indicator 330; a violation by rule numerical indicator 340; a violation by rule description indicator 350; a violation by severity indicator 360; a violation by severity numerical indicator 370; and a violation by rule description indicator 380.

The accessibility report interface 300 can be generated based on one or more instructions, including program instructions, that can be executed on a computing device or computing apparatus, including any of the plurality of client computing devices 110(1)-110(n), the accessibility testing apparatus 120, and the plurality of server computing devices 130(1)-130(n). The one or more instructions can be stored in a computing device (e.g., the accessibility testing apparatus 120, a client computing device, or a server computing device). As an example, the interface for a web page may be generated by a client computing device, such as the plurality of client computing devices 110(1)-110(n) based on instructions that include data from a document object model, which may be interpreted by a server computing device that exchanges data with the client computing device and provides instructions to generate a graphical representation of the interface on an output device (e.g., a display terminal such as a computer monitor).

The elements of the interface may be based on data associated with the status or condition of input sources that may be accessed through actions including crawling web pages, parsing data in the web pages, and comparing the elements in the web page to one or more datasets including a violation dataset.

The violation time stamp indicator 310 includes an indication of the duration that an apparatus performing accessibility testing (e.g., the accessibility testing apparatus 120) used to access, parse, and determine violations in an input source. The violation time stamp indicator 310 can include numerical, text, or pictorial representations of the time used.

The violation score indicator 320 includes an indication of the extent to which the one or more input sources are in compliance with a predetermined accessibility standard, which can be based on a violation criterion including an analysis of the elements of the input source.

The violation by rule indicator 330 includes a graphical representation or summary of the accessibility violations in the one or more input sources. The violation by rule indicator 330 includes a violation by rule numerical indicator 340 that can indicate the number of violation rules that were violated, and a violation by rule description indicator 350 that can indicate the specific violation rule that was violated and the number of times that specific violation rule was violated.

The violation by severity indicator 360 includes a graphical representation or summary of the accessibility violations in the one or more input sources based on the severity of the violation. The severity of the violations can be based on any combination of default severity parameters and severity values or severity parameters and severity values that are customized by a user. The violation by severity indicator 360 includes a violation by severity numerical indicator 370 to indicate the number of each of the violation rules that were violated, which are further grouped based on the severity level. The violation by rule description indicator 380 provides a description of the severity level of the accessibility rule violations.

The operations, steps, or actions, of any method, process, technique, or algorithm described in association with the disclosed technology, can be performed by, or implemented in, any combination of hardware, software, firmware, or circuitry. Further, any of the operations, steps, or actions, of any method, process, technique, or algorithm described in association with the disclosed technology can be implemented in a non-transitory computer-readable medium.

Figure 4:
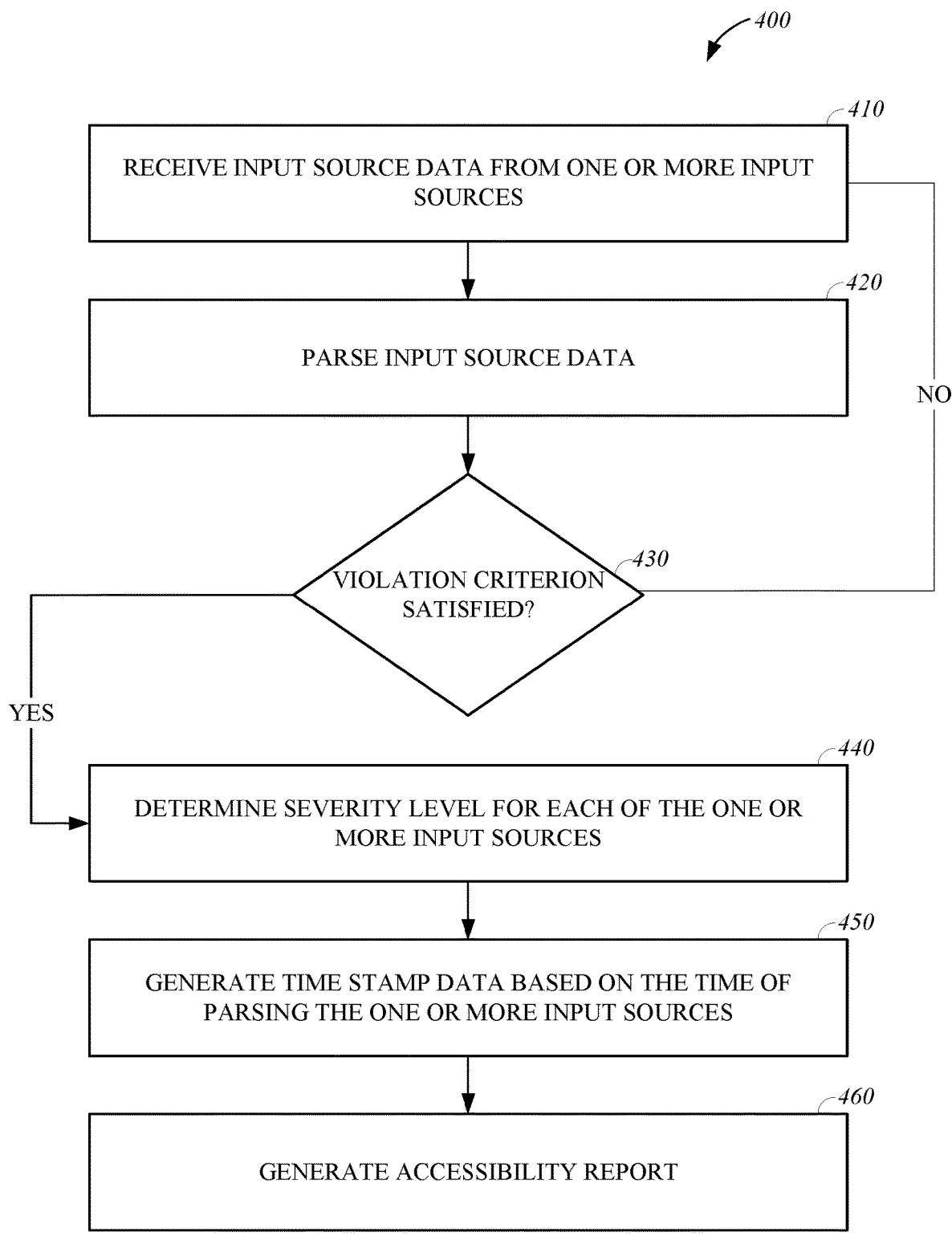
FIG. 4 is a flow diagram illustrating an example of a process for accessibility testing in accordance with the present disclosure.

The process 400, illustrated in FIG. 4, is depicted and described as a series of operations. However, the operations in accordance with this disclosure can occur in various orders or concurrently. Additionally, operations in accordance with this disclosure may occur together with other operations that are not depicted and described in this disclosure.

FIG. 4 is a flow diagram illustrating an example of a process 400 for automated accessibility testing in accordance with the present disclosure. Some or all of the process 400 for automated accessibility testing can be implemented by an apparatus or a system that includes some or all of the features of at least one of the plurality of client computing devices 110(1)-110(n), the accessibility testing apparatus 120, and the plurality of server computing devices 130(1)-130(n), which are shown in FIG. 1; or the accessibility testing apparatus 200 shown in FIG. 2.

In some embodiments, the process 400 for accessibility testing can include: receiving input source data from one or more input sources at operation 410; parsing the input source data at operation 420; determining the one or more input sources that satisfy a violation criterion at operation 430; generating time stamp data for the one or more input sources at operation 440; determining a severity level for each of the one or more input sources that satisfy the violation criterion at operation 450; and generating an accessibility report at operation 460.

At operation 410, input source data is received from one or more input sources. The input source data can be received by a computing device including the plurality of client computing devices 110(1)-110(n), the accessibility testing apparatus 120, and the plurality of server computing devices 130(1)-130(n). Further, the input source data can be received via a communication network including the network 140 and the network 150.

The input source data can be sent or transmitted as a signal that includes data. For example, the input source data can be sent as TCP-IP packets via a communication network such as the network 140 or the network 150, which are illustrated in FIG. 1. In some embodiments, the input source data can be encrypted before sending and may be decrypted, upon receipt, by a receiving device such as the accessibility testing apparatus 120, illustrated in FIG. 1 or the accessibility testing apparatus 200, illustrated in FIG. 2.

The one or more input sources can include any of one or more hyper-text markup language (HTML) document object model (DOM) strings, one or more uniform resource locator (URLs), one or more HTML files, and one or more extensible markup language (XML) files.

In some implementations, the computing device can exchange (send or receive) signals including the input source data with any of the computing devices on which the one or more input sources are stored, hosted, or maintained. The exchange of the signals can include retrieving the input source data from the one or more input sources from the computing devices, including storage devices, on which the one or more input sources are stored, hosted, or maintained.

At operation 420, the input source data is parsed. The parsing can include determining, identifying, or generating, a document object model for each of the one or more input sources. For example, parsing input source data such as an XML document can include accessing the XML document, which can include accessing a document type definition document (DTD) in the XML document. By accessing the contents of the XML, data in the XML document relating to properties or characteristics of the XML document including the structure, layout, or expected contents, can be exposed for later processing (e.g., validation).

In some implementations, a determination of whether, or when, one or more of the one or more input sources includes one or more links to one or more external input sources (e.g., additional input sources in other documents) is made. The parsing of the input source data can include accessing the one or more links to determine a document object model for each of the one or more external input sources that is associated with the one or more links.

For example, an input source HTML document can include links (e.g., hyperlinks) that reference other HTML documents. By accessing the other HTML documents that are referenced in the input source HTML document via the hyperlinks, additional documents associated with the initial group of the one or more input sources can be accessed and parsed.

In some implementations, accessing each of the one or more links is based on a depth level value that indicates any of a number of the one or more links in the one or more external input sources to access (e.g., a maximum or minimum number of URLs to visit), or a crawl depth from the initial input source (e.g., each child node document from the parent node initial input source is an additional crawl depth level).

In some implementations, the parsing of the one or more input sources can include identifying one or more dynamic elements in the one or more input sources. The one or more dynamic elements can include elements of the document that can change based on user inputs, different conditions, or different contexts. The one or more dynamic elements can include client-side scripting (e.g., using JavaScript or ActionScript) or server-side scripting (e.g., using Perl or PHP) which can be used to change the contents, interactivity, or presentation of the one or more input source documents.

Based on identification of the one or more dynamic elements, the one or more dynamic elements in the one or more input sources that are accessible can be determined. The determination of which of the one or more dynamic elements are accessible can be based on a dynamic element dataset that can include data associating dynamic elements with an input source and data associated with the accessibility of the dynamic elements.

For example, the dynamic element dataset can include data relating to a login element in an input source and data associated with the credential and password to access the login element. Accordingly, the parsing can include performing an action (e.g., accessing a website through a login portal) on the one or more dynamic elements in the one or more input sources that are determined to be accessible.

In some implementations, scanning that includes any of the receiving, accessing, or parsing the input source data of the one or more input sources can be performed at one or more predetermined time intervals including at hourly, daily, weekly, or monthly intervals. In this way, accessibility testing can be performed at scheduled times or for scheduled durations in a way that minimizes the disruptive use of computing resources (e.g., scheduling a scan of the input source data during low network traffic time periods).

At operation 430, the one or more input sources that satisfy a violation criterion are determined. The determination of the one or more input sources that satisfy the violation criterion can be based on the parsing of the document object model for each of the one or more input sources.

The determination of the one or more input sources that satisfy the violation criterion can be based on the value of one or more of the characteristics, properties, or attributes, of the input source data including the document object model being equal to a violation criterion value, exceeding a violation criterion value, or being less than a violation criterion value. Further, satisfaction of the violation criterion can be determined based on the evaluation of different combinations of the one or more characteristics, properties, or attributes of the input source data including the document object model. For example, satisfying the violation criterion can include any combination of the total number of violations in a document object model exceeding a predetermined total number of violations threshold, or a severity level of the violations in the document object level exceeding a predetermined severity threshold.

In some implementations, the document object model for each of the one or more input sources can be compared to data including a violation dataset that includes a plurality of violation rules. The violation rules can include rules based on whether the input source data (e.g., the document object model) is in conformity or compliance with a predetermined compliance standard or accessibility standard.

Examples of the violation rules include rules relating to: whether an alternative images element is empty; whether there is alternative text for an image; the presence or structure of a form field title; the presence or structure of a form placeholder; the size of the input source (e.g., the size in kilobytes of an HTML page).

The determination of the one or more input sources that satisfy the violation criterion can be based on the comparison. Based on an extent or degree of correspondence, matching, or similarity between some portion of the document object model and one or more of the plurality of rules in the violation dataset, the violation criterion can be satisfied.

For example, an image element in the document object model can be evaluated based on a comparison to a rule indicating that image elements require alternative text. Based on the comparison of the image element to the rule, the determination that the image element is not associated with alternative text is made.

In some implementations, a violation rule modification message can be received. The violation rule modification request can include instructions to modify, add to, or delete, one or more of the plurality of violation rules. Further, the violation rule modification message can include instructions to change characteristics, properties, attributes, or values of the plurality of violation rules. For example, the violation rule modification message can include an indication that the violation criterion or the weighting of the severity will be updated.

The violation dataset can be updated based on the violation rule modification message. Violation rules can be added (e.g., by a user) so that the plurality of violation rules is in accordance with their customized preferences. Additional violation rules (e.g., violation rules added by a user) can be added to extend the default set of predetermined violation rules. Further, the characteristics, properties, attributes, or values of the plurality of violation rules can be updated to reflect the modifications requested in the violation rule modification message.

At operation 440, one or more violation characteristics for each of the one or more input sources that satisfy the violation criterion can be determined. The one or more violation characteristics for each of the one or more input sources can include a severity level or a type of violation, either of which can be included in an accessibility report that includes an indication of the one or more violation characteristics.

The severity level of the one or more input sources can be based on factors including any combination of a number of violations of one or more of the plurality of rules and the rules of the plurality of violation rules that were violated with respect to a predetermined violation severity value that is associated with any of the plurality of violation rules. For example, a violation rule relating to the maximum size of an input source (e.g., the maximum size of an HTML page) can be weighted more heavily (e.g., greater severity level) than a violation rule relating to an alternative text placeholder for an image.

In some implementations, the one or more violation characteristics can be used to generate a score, such as an accessibility score, that indicates the extent to which the one or more input sources are accessible or in compliance with any combination of the predetermined compliance standard (e.g., rules based on the WCAG 2.0 rule set) and the custom, user created rules. The one or more violation characteristics can be weighted based on a user input or can be weighted based on predetermined default profiles.

With respect to the type of violation, portions of the plurality of rules can be grouped according to the types of violation that the rule relates to. For example, the plurality of rules can be grouped according to whether the violation relates to dynamic elements of the input source, the rendering of visual elements in the input source, the size (e.g., maximum or minimum size) of the input source, and any other characteristics or properties of the input source.

At operation 450, generating, by the computing device, time stamp data including a plurality of time stamps corresponding to the one or more input sources based on a time at which the document object model for each of the one or more input sources was received, accessed, or parsed. In some implementations, an accessibility report can include the time stamp data which can include the time period or time duration to receive, access, or parse the one or more input sources. The time stamp data can be used to estimate how long a scan will take based on the duration of previous receipt, access, or parsing of the one or more input sources. The time stamp data can also be used in the scheduling of future accessibility testing.

At operation 460, a report, such as an accessibility report, is generated. The accessibility report can include data associated with the input source data or the one or more input sources, including the one or more input sources that are determined to satisfy the violation criterion. The accessibility report can include some or all of the elements illustrated in FIG. 3.

The accessibility report can include: a scan time based on the time used to receive, retrieve, access, or parse, the one or more input sources (e.g., a time in minutes and seconds); a violation score, which can be generated based on the characteristics of the violations; a listing or graphical representation (e.g., bar graph, pie chart) of the types of violations based on the violation rule that was violated and including a number of violations; a listing or a graphical representation (e.g., line graph) of the violations based on the severity of the violations; a total number of violations; and the input source associated with the violations.

Furthermore, the accessibility report can include information or data relating to the input sources including: a URL associated with an input source; a description of a violation rule that was violated (e.g., a form-placeholder rule descriptor for the corresponding form-placeholder violation rule); an issue description that can include an indication of the issues or problems associated with the violation rule; a remediation suggestion including an action that can be performed to minimize or eliminate the issue associated with the violation rule (e.g., an alternative images empty rule violation in which there is no placeholder text description in the event an image does not load, can include a suggestion to include the placeholder text description); a path, when applicable, for the input sources; an input source element associated with the violation rule; a priority level based on the severity of the rule (e.g., low priority can include a suggestion to review the element associated with the rule violation, medium priority can include a warning that the rule violation may be a significant departure from the predetermined accessibility standard, and a high priority can include an indication that the element is in violation of a corresponding violation rule); and an assurance level based on a level of assurance that the corresponding rule violation has occurred (e.g., a numerical value or letter grade indicating the assurance level).

Accordingly, the disclosed technology provides a way to more effectively validate and determine compliance of input sources including HTML documents and XML documents. In this way, compliance with standards including the Access Board Section 508 standards and W3C's WCAG 2.0 level A, level AA, and level AAA guidelines can be achieved. As such, the administrators of the input sources can receive valuable feedback that can improve the accessibility of their input sources. Furthermore, administrators of the input sources can create customized violation rules to improve accessibility compliance.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving, by a computing device, input source data from one or more input sources;
in response to a determination that at least one of the one or more input sources includes one or more links to one or more external input sources, parsing, by the computing device, the input source data, wherein the parsing includes determining a document object model for each of the one or more input sources and accessing, based on a depth level value indicating a number of the one or more links in the one or more external input sources to access, the one or more links to determine a document object module for each of the one or more external input sources;
determining, by the computing device, the one or more input sources that satisfy a violation criterion based on the parsing of the document object model for each of the one or more input sources; and
generating, by the computing device, an accessibility report including the one or more input sources that are determined to satisfy the violation criterion.

2. The method of claim 1, wherein the one or more input sources include any of one or more hyper-text markup language (HTML) document object model (DOM) strings, one or more uniform resource locator (URLs), one or more HTML files, and one or more extensible markup language (XML) files.

3. The method of claim 1, further comprising:
determining, by the computing device, whether one of the one or more input sources includes one or more links to one or more external input sources.

4. The method of claim 1, identifying, by the computing device, one or more dynamic elements in the one or more input sources.

5. The method of claim 4, further comprising:
determining, by the computing device, the one or more dynamic elements in the one or more input sources that are accessible, wherein the parsing includes performing an action on the one or more dynamic elements in the one or more input sources that are accessible.

6. The method of claim 1, further comprising:
accessing, by the computing device, the one or more input sources at one or more predetermined time intervals, wherein the parsing the input source data is performed at the one or more predetermined time intervals.

7. The method of claim 1, further comprising:
comparing, by the computing device, the document object model for each of the one or more input sources to a violation dataset including a plurality of violation rules, wherein the determining the one or more input sources that satisfy the violation criterion is based on the comparing.

8. The method of claim 7, further comprising:
receiving, by the computing device, a violation rule modification message to modify, add to, or delete, one or more of the plurality of violation rules; and
updating, by the computing device, the violation dataset based on the violation rule modification message.

9. The method of claim 1, further comprising:
determining, by the computing device, one or more violation characteristics for each of the one or more input sources that satisfy the violation criterion, the one or more violation characteristics for each of the one or more input sources including a severity level or a type of violation, wherein the accessibility report includes an indication of the one or more violation characteristics.

10. The method of claim 1, further comprising:
generating, by the computing device, time stamp data including a plurality of time stamps corresponding to the one or more input sources based on a time at which the document object model for each of the one or more input sources was parsed, wherein the accessibility report includes the time stamp data.

11. An accessibility testing apparatus comprising:
a memory and a processor configured to execute instructions stored in the memory to receive input source data from one or more input sources;
in response to at least one of the one or more input sources including one or more links to one or more external input sources, parse the input source data, wherein the parsing includes determining a document object model for each of the one or more input sources and accessing, based on a depth level value indicating a number of the one or more links in the one or more external input sources to access, the one or more links to determine a document object module for each of the one or more external input sources;
determine the one or more input sources that satisfy a violation criterion based on the parsing of the document object model for each of the one or more input sources; and
generate an accessibility report including the one or more input sources that are determined to satisfy the violation criterion.

12. The apparatus of claim 11, wherein the processor is further configured to execute instructions stored in the memory to:

compare the document object model for each of the one or more input sources to a violation dataset including a plurality of violation rules, wherein the determining the one or more input sources that satisfy the violation criterion is based on the comparing;

receive a violation rule modification request to modify, add to, or delete, one or more of the plurality of violation rules; and update the violation dataset based on the violation rule modification request.

13. The apparatus of claim 11, wherein the processor is further configured to execute instructions stored in the memory to:

identify one or more dynamic elements in the one or more in sources.

14. The apparatus of claim 13, wherein the processor is further configured to execute instructions stored in the memory to:

determine the one or more dynamic elements in the one or more input sources that are accessible, wherein the parsing includes performing an action on the one or more dynamic elements in the one or more input sources that are accessible.

15. The apparatus of claim 11, wherein the processor is further configured to execute instructions stored in the memory to:

generate time stamp data including a plurality of time stamps corresponding to the one or more input sources based on a time at which the document object model for each of the one or more input sources was parsed, wherein the accessibility report includes the time stamp data.

16. A non-transitory computer-readable storage medium, comprising executable instructions that, when executed by a processor, perform operations comprising:

receiving input source data from one or more input sources;

in response to at least one of the one or more input sources including one or more links to one or more external input sources, parsing the input source data, wherein the parsing includes determining a document object model for each of the one or more input sources and accessing, based on a depth level value indicating a number of the one or more links in the one or more external input sources to access, the one or more links to determine a document object module for each of the one or more external input sources;

determining the one or more input sources that satisfy a violation criterion based on the parsing of the document object model for each of the one or more input sources; and generating an accessibility report including the one or more input sources that are determined to satisfy the violation criterion.

17. The non-transitory computer-readable storage medium of claim 16, further comprising:

comparing the document object model for each of the one or more input sources to a violation dataset including a plurality of violation rules, wherein the determining the one or more input sources that satisfy the violation criterion is based on the comparing;

receiving a violation rule modification request to modify, add to, or delete, one or more of the plurality of violation rules; and updating the violation dataset based on the violation rule modification request.

18. The non-transitory computer-readable storage medium of claim 16, further comprising:

identifying one or more dynamic elements in the one or more input sources.

19. The non-transitory computer-readable storage medium of claim 18, further comprising:

determining the one or more dynamic elements in the one or more input sources that are accessible, wherein the parsing includes performing an action on the one or more dynamic elements in the one or more input sources that are accessible.

20. The non-transitory computer-readable storage medium of claim 16, further comprising:

generating time stamp data including a plurality of time stamps corresponding to the one or more input sources based on a time at which the document object model for each of the one or more input sources was parsed, wherein the accessibility report includes the time stamp data.

* * * * *